United States Patent [19]
Lundy

[11] Patent Number: 6,029,985
[45] Date of Patent: Feb. 29, 2000

[54] METHOD AND STRUCTURE FOR MAKING CASTER AND PINION ANGLE ADJUSTMENT FOR MOTOR VEHICLE AXLE ASSEMBLIES

[75] Inventor: Mark H. Lundy, Fort Wayne, Ind.

[73] Assignee: Dana Corporation, Toledo, Ohio

[21] Appl. No.: 09/095,528

[22] Filed: Jun. 10, 1998

[51] Int. Cl.⁷ .................................................. B62D 17/00
[52] U.S. Cl. ...................................................... 280/86.753
[58] Field of Search ........................... 280/86.751, 86.753

[56] References Cited

U.S. PATENT DOCUMENTS

| | | | |
|---|---|---|---|
| 1,812,827 | 6/1931 | Gannett . | |
| 3,237,957 | 3/1966 | Harbers | 280/6 |
| 3,332,701 | 7/1967 | Masser | 280/124 |
| 3,547,215 | 12/1970 | Bird | 180/71 |
| 4,194,760 | 3/1980 | Shiomi et al. | 280/661 |
| 4,858,949 | 8/1989 | Wallace et al. | 280/713 |
| 4,863,187 | 9/1989 | Artz | 280/661 |
| 4,948,160 | 8/1990 | Barry | 280/86.753 |
| 4,991,868 | 2/1991 | VanDenberg | 280/711 |
| 5,052,711 | 10/1991 | Pirkey et al. | 280/86.753 |
| 5,129,669 | 7/1992 | Specktor et al. | 280/86.753 |
| 5,288,100 | 2/1994 | Cherry et al. | 280/688 |
| 5,382,043 | 1/1995 | Jordan | 280/86.753 |
| 5,476,251 | 12/1995 | Moses et al. | 267/52 |
| 5,651,561 | 7/1997 | Tandy, Jr. et al. | 280/86.753 |

*Primary Examiner*—Kenneth R. Rice
*Attorney, Agent, or Firm*—Oldham & Oldham Co., L.P.A.

[57] ABSTRACT

Method and structure for making caster and pinion angle adjustment to motor vehicle axle assemblies which have only minimal capability for caster and pinion angle adjustment as originally manufactured including formed adjuster brackets which are attached to an appropriately modified axle mounting bracket. The formed adjuster brackets act as a reaction point for actuating a cam bolt which positions a mounting member at a desired location in an adjustment slot.

20 Claims, 3 Drawing Sheets

6,029,985

METHOD AND STRUCTURE FOR MAKING CASTER AND PINION ANGLE ADJUSTMENT FOR MOTOR VEHICLE AXLE ASSEMBLIES

BACKGROUND AND SUMMARY OF THE INVENTION

The present invention relates generally to a new and novel method and structure for making caster and pinion angle adjustment for motor vehicle axle assemblies. More particularly, the present invention relates to a method and structure for making caster and pinion angle adjustment for motor vehicle axle assemblies where the motor vehicle axle assemblies have only minimal capability for caster and pinion angle adjustment as originally manufactured including formed adjuster brackets which are attached to an appropriately modified axle mounting bracket. The formed adjuster brackets act as a reaction point for actuating a cam bolt which positions a mounting member at a desired location in an adjustment slot.

Motor vehicles, such as four-wheel drive trucks and automobiles, often employ a solid axle structure arrangement in which a tube yoke is fixedly attached to the solid axle. Pivoting members, such as ball joints, are typically positioned between the tube yoke and a steering knuckle which, in turn, carry a spindle upon which a motor vehicle wheel is mounted for rotation therewith. By incorporating an axle design where the common rotational axis of the pivoting members is positioned other than vertical, when mounted in a vehicle, caster angle is thereby introduced into the suspension system. Pinion angle is determined by the relationship of the axle's center section relative to the axle's vehicle attachment points. Generally beam-type steering axles have an unalterable relationship between caster angle and pinion angle. Any effort that results in a change to one characteristic will also cause a change in the other. Axles that do not incorporate steering capacity have no caster, but retain the pinion angle characteristic only.

Caster gives the motor vehicle steering wheel the ability to return to center after a turn. An increase in caster generally results in an increase in steering effort. In conjunction with other suspension system geometry factors, proper caster contributes to a reduction in wheel shimmy.

A vehicle with improperly adjusted caster will lose some of its natural tracking ability which is commonly referred to as a loss of "on center feel." The steering wheel may not stay centered when hand pressure is released. Improperly adjusted caster may cause a lead condition where the vehicle pulls to one direction. Improper caster adjustment may also be responsible for excessive steering effort.

Caster adjustments are important in providing proper motor vehicle directional stability, handling characteristics and safety. Pinion angle adjustment is important for optimum driveline joint life, and for minimization of noise, vibration and harshness (NVH) related customer complaints.

Thus, motor vehicle caster or pinion angle misadjustment can result in customer dissatisfaction through poor vehicle handling, increased levels of vibration or noise within the passenger compartment.

Dimensional variation is inherent in the manufacturing processes commonly utilized to fabricate axles, vehicle bodies, and the associated attachment-mounting members. The result is that caster and pinion angles will vary from vehicle to vehicle. These dimensional variations may, in total, deviate sufficiently from ideal values that adjustment is desirable. An additional need for caster and pinion angle adjustment occurs for vehicles originally produced with acceptable caster and pinion angles which have subsequently been detrimentally altered through impact or collision.

Many traditional beam-type axles are manufactured with fixed caster and pinion angles. Fixed settings have the advantage of being the simplest and lowest cost to manufacture. Having a method and structure to provide caster and pinion angle adjustment for vehicles originally manufactured without such a provision, is desirable. Economically, only the vehicles actually needing adjustment would be modified. This avoids the unnecessary manufacturing operations and increased costs necessary to provide adjustment capability for every originally manufactured axle. The majority of all axles produced may never actually require such adjustment.

Various methods and structures have been used in an attempt to provide for motor vehicle caster and pinion angle adjustment. For example, in some instances, slotted brackets with welded in place cam bolt reaction members have been used. This methodology is costly due to the additional stamping required for the reaction members, followed by extra fabrication operations to locate and weld these members in place on one hundred percent of the original equipment brackets. Other prior art caster and pinion angle adjustment arrangements have utilized cam bolt reaction points created by raising the parent material of the bracket during the bracket forming operation. This arrangement requires that the final hole or slot position be determined at the time of bracket manufacturing. This substantially reduces the ability to control other axle characteristics which are achievable only by creating the mounting hole after the bracket is welded in place on the axle tube assembly. Maintenance of the forming dies and dimensional control of the raised material becomes more critical. Such prior art methods leave opportunities for reduction in cost and complexity.

A preferred embodiment of the present invention is, therefor, directed to a method and structure for making caster and pinion angle adjustment to motor vehicle axle assemblies which have only minimal capability for caster and pinion angle adjustment as originally manufactured including formed adjuster brackets which are attached to an appropriately modified axle mounting bracket. The formed adjuster brackets act as a reaction point for actuating a cam bolt which positions a mounting member at a desired location in an adjustment slot.

Accordingly, the method and structure for making caster and pinion angle adjustment to motor vehicle axle assemblies in accordance with the present invention provides a simple, cost-effective arrangement for adjusting caster and pinion angle in motor vehicle axle assemblies.

Other advantages and novel features of the present invention will become apparent in the following detailed description of the invention when considered in conjunction with the accompanying drawings.

DETAILED DESCRIPTION OF THE DRAWINGS

Figure 1:
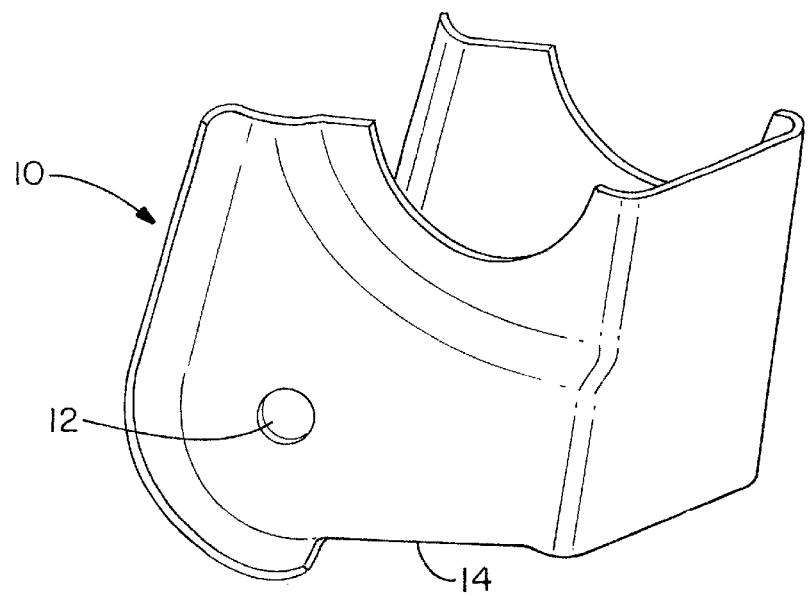
FIG. 1 illustrates a perspective view of an original equipment manufacturer (OEM) axle mounting bracket which has only minimal capability for caster and pinion angle adjustment of the motor vehicle axle assembly.

In the following detailed description of a preferred embodiment of the present invention, reference is made to the accompanying drawings which, in conjunction with this detailed description, illustrate and describe a preferred embodiment of a motor vehicle wheel axle assembly which permits caster and pinion angle adjustment in accordance with the present invention. Referring now to the drawings, in which like-referenced characters indicate corresponding elements throughout the several views, attention is first directed to FIG. 1, which illustrates a perspective view of an original equipment manufacturer (OEM) axle mounting bracket which has only minimal capability for caster and pinion angle adjustment of the motor vehicle axle assembly, generally identified by reference numeral 10, original equipment manufacturer (OEM) axle mounting bracket 10 is designed for use on a motor vehicle axle assembly. Original equipment manufacturer (OEM) axle mounting bracket 10 preferably includes substantially circular opening 12, as manufactured, through which a fastener is inserted to retain a control arm to the motor vehicle axle assembly. Original equipment manufacturer (OEM) axle mounting bracket 10, as manufactured, provides only minimal capability to adjust the caster or pinion angle of the motor vehicle axle assembly.

Figure 3:
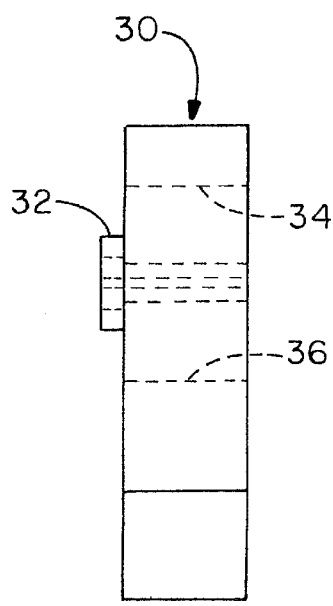
FIG. 3 illustrates a side elevational view of the service tool shown in FIG. 2 used to make appropriate modifications to the original equipment manufacturer (OEM) axle mounting bracket shown in FIG. 1 to provide the capability for caster and pinion angle adjustment of the motor vehicle axle assembly in accordance with a preferred embodiment of the present invention.
Figure 2:
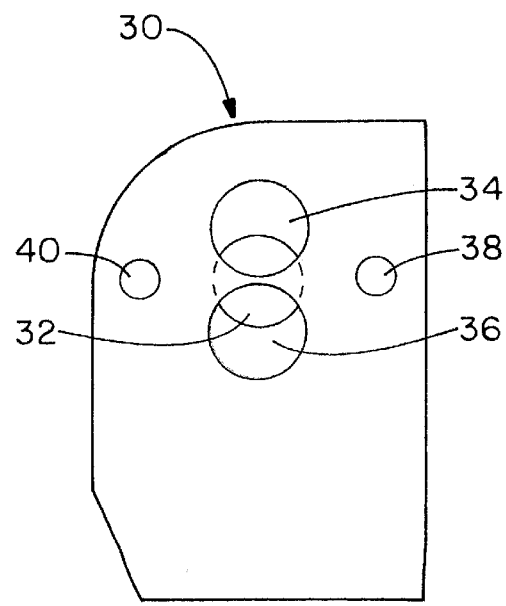
FIG. 2 illustrates a front elevational view of a service tool used to make appropriate modifications to the original equipment manufacturer (OEM) axle mounting bracket shown in FIG. 1 to provide the capability for caster and pinion angle adjustment of the motor vehicle axle assembly in accordance with a preferred embodiment of the present invention.

Referring now to FIGS. 2 and 3, which show a front elevational view and a side elevational view, respectively, of service tool 30 used to make appropriate modifications to original equipment manufacturer (OEM) axle mounting bracket 10 to provide the capability for caster and pinion angle adjustment of the motor vehicle axle assembly in accordance with a preferred embodiment of the present invention, service tool 30 includes outwardly extending projection 32 which is preferably slightly smaller than substantially circular opening 12 in original equipment manufacturer (OEM) axle mounting bracket 10 to permit outwardly extending projection 32 to be inserted into substantially circular opening 12. Service tool 30 also includes first relatively large substantially circular opening 34 which is positioned substantially above outwardly extending projection 32 and second relatively large substantially circular opening 36 which is positioned substantially below outwardly extending projection 32. Service tool 30 also includes first relatively small substantially circular opening 38 positioned a predetermined distance to the right side of outwardly extending projection 32 and second relatively small substantially circular opening 40 positioned a predetermined distance to the left side of outwardly extending projection 32. Service tool 30 is preferably fabricated from a hardened tool steel type material and may include, if desired, hardened bushings in one or more of first relatively large substantially circular opening 34, second relatively large substantially circular opening 36, first relatively small substantially circular opening 38 and second relatively small substantially circular opening 40 to preclude excessive wear to these features during extended use of service tool 30.

Figure 4:
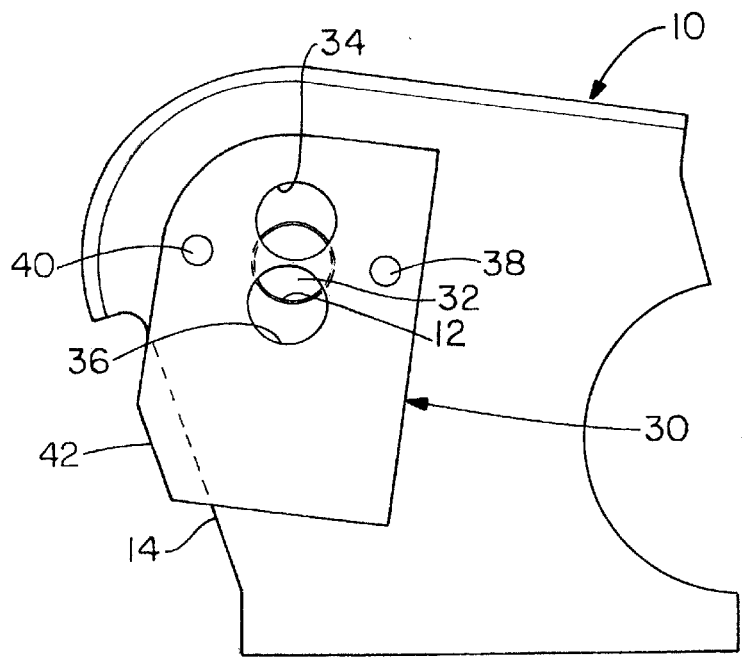
FIG. 4 illustrates a front elevational view of the original equipment manufacturer (OEM) axle mounting bracket shown in FIG. 1 with the service tool shown in FIGS. 2 and 3 positioned thereon to make appropriate modifications to provide the capability for caster and pinion angle adjustment of the motor vehicle axle assembly in accordance with a preferred embodiment of the present invention.

Referring now to FIG. 4, which shows a front elevational view of original equipment manufacturer (OEM) axle mounting bracket 10 with service tool 30 positioned thereon to make appropriate modifications to provide the capability for caster and pinion angle adjustment of the motor vehicle axle assembly in accordance with a preferred embodiment of the present invention, outwardly extending projection 32 of service tool 30 is inserted into substantially circular opening 12 in original equipment manufacturer (OEM) axle mounting bracket 10 and service tool 30 is orientated such that first relatively large substantially circular opening 34 is substantially upward from, second large substantially circular opening 36 is substantially downward from, first relatively small substantially circular opening 38 is substantially to the right of and second relatively small substantially circular opening 40 is substantially to the left of substantially circular opening 12 in original equipment manufacturer (OEM) axle mounting bracket 10. If desired, side surface 42 of service tool 30 could be designed to correspond with side surface 14 of original equipment manufacturer (OEM) axle mounting bracket 10 when outwardly extending projection 32 is inserted into substantially circular opening 12 of original equipment manufacturer (OEM) axle mounting bracket 10 to properly orient first relatively large substantially circular opening 34, second large substantially circular opening 36, first relatively small substantially circular opening 38 and second relatively small substantially circular opening 40 in relation to substantially circular opening 12 in original equipment manufacturer (OEM) axle mounting bracket 10.

Figure 5:
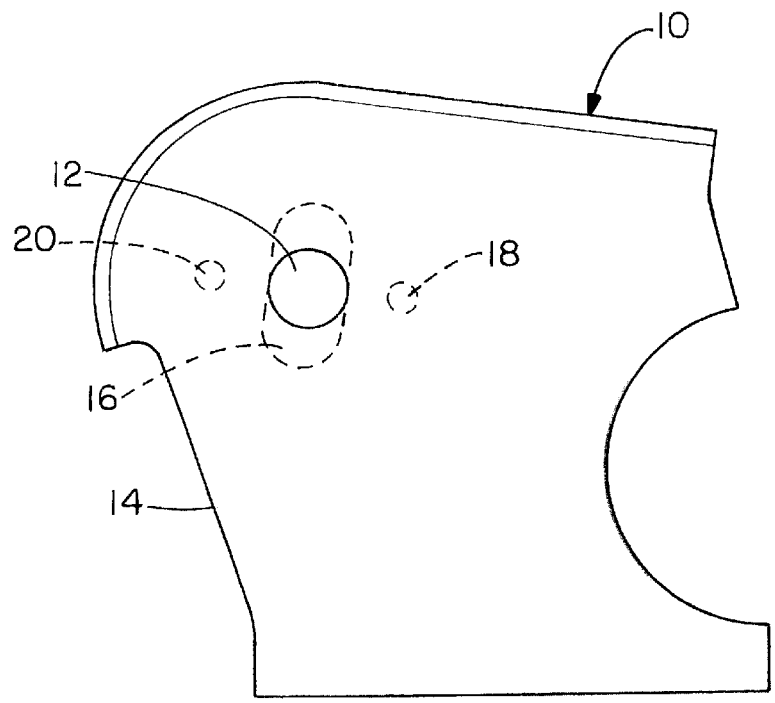
FIG. 5 illustrates a front elevational view of the original equipment manufacturer (OEM) axle mounting bracket shown in FIG. 1 showing the appropriate modifications to be made using the service tool shown in FIGS. 2 and 3 to provide the capability for caster and pinion angle adjustment of the motor vehicle axle assembly in accordance with a preferred embodiment of the present invention.

Referring now to FIG. 5, which shows a front elevational view of original equipment manufacturer (OEM) axle mounting bracket 10 with the appropriate modifications to be made using service tool 30 to provide the capability for caster and pinion angle adjustment of the motor vehicle axle assembly in accordance with a preferred embodiment of the present invention, substantially circular opening 12 in original equipment manufacturer (OEM) axle mounting bracket 10 is preferably extended upward to include first relatively large substantially circular opening 34 and downward to include second relatively large substantially circular opening 36 to form elongated opening 16. In addition, first relatively small substantially circular opening 18 is positioned a predetermined distance to the right of elongated opening 16 and second relatively small substantially circular opening 20 is positioned a predetermined distance to the left of elongated opening 16.

Figure 6:
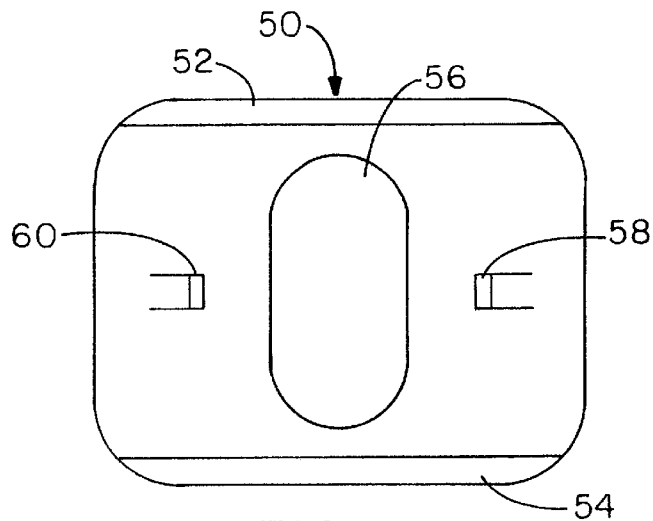
FIG. 6 illustrates a front elevational view of a formed adjuster bracket which is attached to the original equipment manufacturer (OEM) axle mounting bracket shown in FIG. 1 having the appropriate modifications incorporated therein using the service tool shown in FIGS. 2 and 3 to provide the capability for caster and pinion angle adjustment of the motor vehicle axle assembly in accordance with a preferred embodiment of the present invention.
Figure 8:
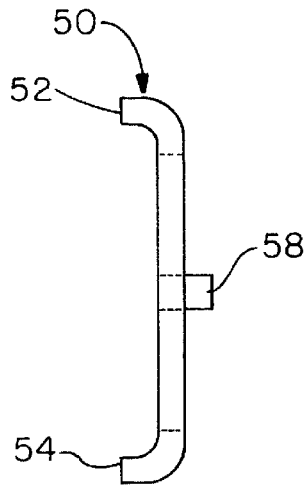
FIG. 8 illustrates a side elevational view of the formed adjuster bracket shown in FIGS. 6 and 7 which is attached to the original equipment manufacturer (OEM) axle mounting bracket shown in FIG. 1 having the appropriate modifications incorporated therein using the service tool shown in FIGS. 2 and 3 to provide the capability for caster and pinion angle adjustment of the motor vehicle axle assembly in accordance with a preferred embodiment of the present invention.
Figure 7:
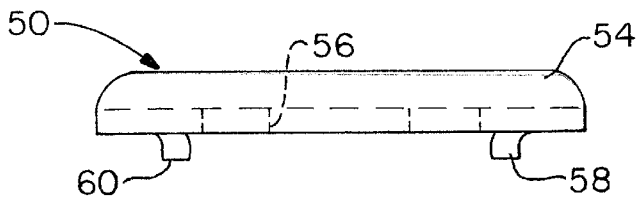
FIG. 7 illustrates a top plan view of the formed adjuster bracket shown in FIG. 6 which is attached to the original equipment manufacturer (OEM) axle mounting bracket shown in FIG. 1 having the appropriate modifications incorporated therein using the service tool shown in FIGS. 2 and 3 to provide the capability for caster and pinion angle adjustment of the motor vehicle axle assembly in accordance with a preferred embodiment of the present invention.

Referring now to FIGS. 6, 7 and 8 which illustrate a front elevational view, a top plan view and a side elevational view, respectively, of formed adjuster bracket 50 which is attached to original equipment manufacturer (OEM) axle mounting bracket 10 having the appropriate modifications incorporated therein using service tool 30 to provide the capability for caster and pinion angle adjustment of the motor vehicle axle assembly in accordance with a preferred embodiment of the present invention, formed adjuster bracket 50 is preferably a substantially planar member and has a substantially rectangular configuration. Formed adjuster bracket 50 is preferably fabricated from a sheet metal material, most preferably steel, and includes two (2) upturned edge portions 52 and 54 to provide a reaction point for actuating a cam bolt against either surface near the circular ends of elongated opening 56 which corresponds to elongated opening 16 in original equipment manufacturer (OEM) axle mounting bracket 10. In addition, formed adjuster bracket 50 includes first outwardly extending tab 58 which corresponds to first relatively small substantially circular opening 18 of original equipment manufacturer (OEM) axle mounting bracket 10 and second outwardly extending tab 60 which corresponds to second relatively small substantially circular opening 20 of original equipment manufacturer (OEM) axle mounting bracket 10.

Figure 9:
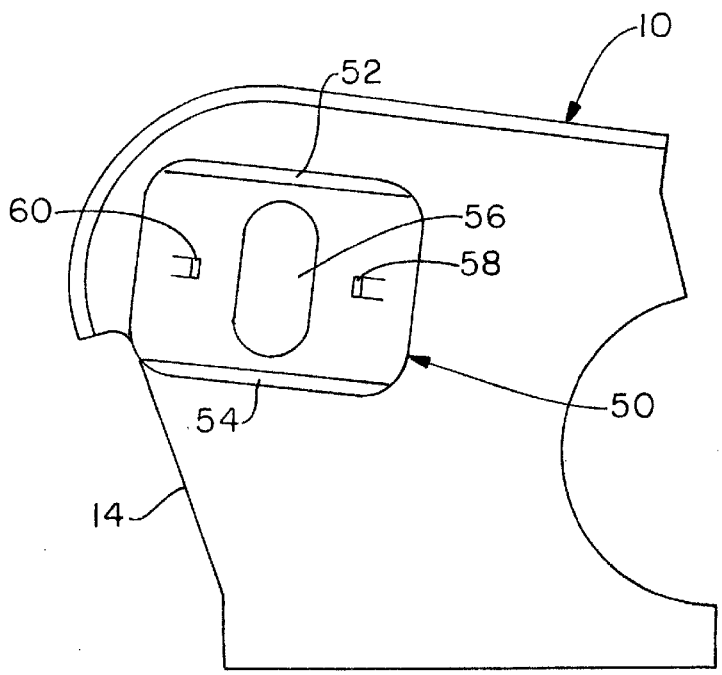
FIG. 9 illustrates a front plan view of the formed adjuster bracket shown in FIGS. 6 through 8 attached to the original equipment manufacturer (OEM) axle mounting bracket shown in FIG. 1 having the appropriate modifications incorporated therein using the service tool shown in FIGS. 2 and 3 to provide the capability for caster and pinion angle adjustment of the motor vehicle axle assembly in accordance with a preferred embodiment of the present invention.

Referring now to FIG. 9, which shows a front plan view of formed adjuster bracket 50 attached to original equipment manufacturer (OEM) axle mounting bracket 10 having the appropriate modifications incorporated therein using service tool 30 to provide the capability for caster and pinion angle adjustment of the motor vehicle axle assembly in accordance with a preferred embodiment of the present invention, first outwardly extending tab 58 is positioned in first relatively small substantially circular opening 18 in original equipment manufacturer (OEM) axle mounting bracket 10 and second outwardly extending tab 60 is positioned in second relatively small substantially circular opening 20 in original equipment manufacturer (OEM) axle mounting bracket 10 to position formed adjuster bracket 50 on original equipment manufacturer (OEM) axle mounting bracket 10.

To modify original equipment manufacturer (OEM) axle mounting bracket 10 to provide the capability for caster and pinion angle adjustment of the motor vehicle axle assembly in accordance with a preferred embodiment of the present invention, outwardly extending projection 32 of service tool 30 is inserted into substantially circular opening 12 in original equipment manufacturer (OEM) axle mounting bracket 10 and first relatively large substantially circular opening 34 is positioned substantially above outwardly extending projection 32, second relatively large substantially circular opening 36 is positioned substantially below outwardly extending projection 32, first relatively small substantially circular opening 38 is positioned to the right of outwardly extending projection 32 and second relatively small substantially circular opening 40 is positioned to the left of outwardly extending projection 32. Holes are then drilled or punched through first relatively large substantially circular opening 34, second relatively large substantially circular opening 36, first relatively small substantially circular opening 38 and second relatively small substantially circular opening 40 in service tool 30 and service tool 30 is removed from original equipment manufacturer (OEM) axle mounting bracket 10. Additional material is then removed between substantially circular opening 12 in original equipment manufacturer (OEM) axle mounting bracket 10 and the hole drilled or punched through first relatively large substantially circular opening 34 and the hole drilled or punched through second relatively large substantially circular opening 36 to form elongated opening 16 in original equipment manufacturer (OEM) axle mounting bracket 10. Formed adjuster bracket 50 is then positioned on original equipment manufacturer (OEM) axle mounting bracket 10 by inserting first outwardly extending tab 58 through first relatively small substantially circular opening 18 in original equipment manufacturer (OEM) axle mounting bracket 10 and inserting second outwardly extending tab 60 through second relatively small substantially circular opening 20 in original equipment manufacturer (OEM) axle mounting bracket 10. Formed adjuster brackets 50 are retained in position by a fastener with cams which passes through elongated openings 16 in original equipment manufacturer (OEM) axle mounting bracket 10 and elongated openings 56 in formed adjuster brackets 50 to retain the control arm to the motor vehicle axle assembly. The caster and pinion angle of the motor vehicle axle assembly can be adjusted as desired by rotating the fastener cams against upturned edge portion 52 or upturned edge portion 54 of adjuster bracket 50 causing original equipment manufacturer (OEM) axle mounting bracket 10 to move relative to the control arm through elongated openings 16 and 56 in original equipment manufacturer (OEM) axle mounting bracket 10 and formed adjuster bracket 50, respectively.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A method for making caster and pinion angle adjustment for each side of a motor vehicle axle assembly having an original equipment manufacturer (OEM) axle mounting bracket with a substantially circular opening therein on each side thereof, the original equipment manufacturer (OEM) axle mounting bracket being retained by a fastener inserted through the substantially circular opening in the original equipment manufacturer (OEM) axle mounting bracket, the fastener also retaining a control arm to the motor vehicle axle assembly, said method for making caster and pinion adjustment for a motor vehicle axle assembly comprising the steps of:

(a) removing material substantially above and below the substantially circular opening in said original equipment manufacturer (OEM) axle mounting bracket to form an elongated opening in said original equipment manufacturer (OEM) axle mounting bracket;

(b) removing material to the right of the substantially circular opening in said original equipment manufacturer (OEM) axle mounting bracket to form a first relatively small substantially circular opening in said original equipment manufacturer (OEM) axle mounting bracket;

(c) removing material to the left of the substantially circular opening in said original equipment manufacturer (OEM) axle mounting bracket to form a second relatively small substantially circular opening in said original equipment manufacturer (OEM) axle mounting bracket;

(d) repeating the above steps (a) through (c) for the other side of said original equipment manufacturer (OEM) axle mounting bracket;

(e) repeating the above steps (a) through (d) for said original equipment manufacturer (OEM) axle mounting bracket on the other side of the motor vehicle axle assembly;

(f) providing four (4) formed adjuster brackets, two (2) for each side of the motor vehicle axle assembly, each of the four (4) formed adjuster brackets having an elongated opening corresponding to said elongated opening in said original equipment manufacturer (OEM) axle mounting bracket, a first outwardly extending tab corresponding to said first relatively small substantially circular opening in said original equipment manufacturer (OEM) axle mounting bracket and a second outwardly extending tab corresponding to said second relatively small substantially circular opening in said original equipment manufacturer (OEM) axle mounting bracket; and (g) retaining said formed adjuster brackets in position on said original equipment manufacturer (OEM) axle mounting bracket by inserting a cam equipped fastener which retains the control arm from the motor vehicle axle assembly through said elongated opening in said original equipment manufacturer (OEM) axle mounting bracket and said elongated opening in said formed adjuster bracket.

2. The method for making caster and pinion angle adjustment for a motor vehicle axle assembly in accordance with claim 1, wherein a service tool is used to assist in the steps of removing material substantially above and below the substantially circular opening in said original equipment manufacturer (OEM) axle mounting bracket to form an elongated opening in said original equipment manufacturer (OEM) axle mounting bracket, removing material to the right of the substantially circular opening in said original equipment manufacturer (OEM) axle mounting bracket to form a first relatively small substantially circular opening in said original equipment manufacturer (OEM) axle mounting bracket and removing material to the left of the substantially circular opening in said original equipment manufacturer (OEM) axle mounting bracket to form a second relatively small substantially circular opening in said original equipment manufacturer (OEM) axle mounting bracket.

3. The method for making caster and pinion angle adjustment for a motor vehicle axle assembly in accordance with claim 1, wherein a service tool having an outwardly extending projection which is received in the substantially circular opening in said original equipment manufacturer (OEM) axle mounting bracket is used to assist in the steps of removing material substantially above and below the substantially circular opening in said original equipment manufacturer (OEM) axle mounting bracket to form an elongated opening in said original equipment manufacturers (OEM) axle mounting bracket, removing material to the right of the substantially circular opening in said original equipment manufacturer (OEM) axle mounting bracket to form a first relatively small substantially circular opening in said original equipment manufacturer (OEM) axle mounting bracket and removing material to the left of the substantially circular opening in said original equipment manufacturer (OEM) axle mounting bracket to form a second relatively small substantially circular opening in said original equipment manufacturer (OEM) axle mounting bracket.

4. The method for making caster and pinion angle adjustment for a motor vehicle axle assembly in accordance with claim 1, wherein a service tool having a first relatively large substantially circular opening, a second relatively large substantially circular opening, a first relatively small substantially circular opening and a second relatively small substantially circular opening is used to assist in the steps of removing material substantially above and below the substantially circular opening in said original equipment manufacturer (OEM) axle mounting bracket to form an elongated opening in said original equipment manufacturer (OEM) axle mounting bracket, removing material to the right of the substantially circular opening in said original equipment manufacturer (OEM) axle mounting bracket to form a first relatively small substantially circular opening in said original equipment manufacturer (OEM) axle mounting bracket and removing material to the left of the substantially circular opening in said original equipment manufacturer (OEM) axle mounting bracket to form a second relatively small substantially circular opening in said original equipment manufacturer (OEM) axle mounting bracket.

5. The method for making caster and pinion angle adjustment for a motor vehicle axle assembly in accordance with claim 1, wherein a service tool having an outwardly extending projection which is received in the substantially circular opening in said original equipment manufacturer (OEM) axle mounting bracket and a first relatively large substantially circular opening positioned substantially upward from said outwardly extending projection, a second relatively large substantially circular opening positioned substantially downward from said outwardly extending projection, a first relatively small substantially circular opening positioned to the right of said outwardly extending projection and a second relatively small substantially circular opening positioned to the left of said outwardly extending projection is used to assist in the steps of removing material substantially above and below the substantially circular opening in said original equipment manufacturer (OEM) axle mounting bracket to form an elongated opening in said original equipment manufacturers (OEM) axle mounting bracket, removing material to the right of the substantially circular opening in said original equipment manufacturer (OEM) axle mounting bracket to form a first relatively small substantially circular opening in said original equipment manufacturer (OEM) axle mounting bracket and removing material to the left of the substantially circular opening in said original equipment manufacturer (OEM) axle mounting bracket to form a second relatively small substantially circular opening in said original equipment manufacturer (OEM) axle mounting bracket.

6. The method for making caster and pinion angle adjustment for a motor vehicle axle assembly in accordance with claim 5, further including the step of removing additional material from between said first relatively large substantially circular opening positioned substantially upward from said outwardly extending projection and the substantially circular opening in said original equipment manufacturer (OEM) axle mounting bracket and between said second relatively large substantially circular opening positioned substantially downward from said outwardly extending projection and the substantially circular opening in said original equipment manufacturer (OEM) axle mounting bracket following the step of removing material substantially above and below the substantially circular opening in said original equipment manufacturer (OEM) axle mounting bracket to form an elongated opening in said original equipment manufacturer (OEM) axle mounting bracket.

7. The method for making caster and pinion angle adjustment for a motor vehicle axle assembly in accordance with claim 5, wherein the steps of removing material substantially above and below the substantially circular opening in said original equipment manufacturer (OEM) axle mounting bracket to form an elongated opening in said original equipment manufacturer (OEM) axle mounting bracket, removing material to the right of the substantially circular opening in said original equipment manufacturer (OEM) axle mounting bracket to form a first relatively small substantially circular opening in said original equipment manufacturer (OEM) axle mounting bracket and removing material to the left of the substantially circular opening in said original equipment manufacturer (OEM) axle mounting bracket to form a second relatively small substantially circular opening in said original equipment manufacturer (OEM) axle mounting bracket are performed by drilling operations.

8. The method for making caster and pinion angle adjustment for a motor vehicle axle assembly in accordance with claim 5, wherein the steps of removing material substantially above and below the substantially circular opening in said original equipment manufacturer (OEM) axle mounting bracket to form an elongated opening in said original equipment manufacturer (OEM) axle mounting bracket, removing material to the right of the substantially circular opening in said original equipment manufacturer (OEM) axle mounting bracket to form a first relatively small substantially circular opening in said original equipment manufacturer (OEM) axle mounting bracket and removing material to the left of the substantially circular opening in said original equipment manufacturer (OEM) axle mounting bracket to form a second relatively small substantially circular opening in said original equipment manufacturer (OEM) axle mounting bracket are performed by punching operations.

9. The method for making caster and pinion angle adjustment for a motor vehicle axle assembly in accordance with claim 1, wherein the steps of removing material substantially above and below the substantially circular opening in said original equipment manufacturer (OEM) axle mounting bracket to form an elongated opening in said original equipment manufacturers (OEM) axle mounting bracket, removing material to the right of the substantially circular opening in said original equipment manufacturer (OEM) axle mounting bracket to form a first relatively small substantially circular opening in said original equipment manufacturer (OEM) axle mounting bracket and removing material to the left of the substantially circular opening in said original equipment manufacturer (OEM) axle mounting bracket to form a second relatively small substantially circular opening in said original equipment manufacturer (OEM) axle mounting bracket are performed by drilling operations.

10. The method for making caster and pinion angle adjustment for a motor vehicle axle assembly in accordance with claim 1, wherein the steps of removing material substantially above and below the substantially circular opening in said original equipment manufacturer (OEM) axle mounting bracket to form an elongated opening in said original equipment manufacturer (OEM) axle mounting bracket, removing material to the right of the substantially circular opening in said original equipment manufacturer (OEM) axle mounting bracket to form a first relatively small substantially circular opening in said original equipment manufacturer (OEM) axle mounting bracket and removing material to the left of the substantially circular opening in said original equipment manufacturer (OEM) axle mounting bracket to form a second relatively small substantially circular opening in said original equipment manufacturer (OEM) axle mounting bracket are performed by punching operations.

11. A service tool for making modifications to an original equipment manufacturer (OEM) axle mounting bracket with a substantially circular opening therein to facilitate caster and pinion angle adjustment for a motor vehicle axle assembly, said service tool comprising a substantially planar member having an outwardly extending projection which is slightly smaller than the substantially circular opening in said original equipment manufacturer (OEM) axle mounting bracket to allow said outwardly extending projection to be received in the substantially circular opening, a first relatively large substantially circular opening positioned substantially above said outwardly extending projection, a second relatively large substantially circular opening positioned substantially below said outwardly extending projection, a first relatively small substantially circular opening positioned to the right of said outwardly extending projection and a second relatively small substantially circular opening positioned to the left of said outwardly extending projection.

12. The service tool for making modifications to an original equipment manufacturer (OEM) axle mounting bracket with a substantially circular opening therein to facilitate caster and pinion angle adjustment for a motor vehicle axle assembly in accordance with claim 11, wherein said service tool includes a side surface which corresponds to a side surface of said original equipment manufacturer (OEM) axle mounting bracket when said service tool is properly positioned in relation to said original equipment manufacturer (OEM) axle mounting bracket to facilitate positioning of said service tool in relation to said original equipment manufacturer (OEM) axle mounting bracket.

13. The service tool for making modifications to an original equipment manufacturer (OEM) axle mounting bracket with a substantially circular opening therein to facilitate caster and pinion angle adjustment for a motor vehicle axle assembly in accordance with claim 11, wherein said service tool is fabricated from a hardened tool steel material.

14. The service tool for making modifications to an original equipment manufacturer (OEM) axle mounting bracket with a substantially circular opening therein to facilitate caster and pinion angle adjustment for a motor vehicle axle assembly in accordance with claim 11, wherein said service tool includes a hardened bushing in each of said first relatively large substantially circular opening, said second relatively large substantially circular opening, said first relatively small substantially circular opening and said second relatively small substantially circular opening.

15. A formed adjuster bracket for attachment to an original equipment manufacturer (OEM) axle mounting bracket which has been modified to include an elongated opening, a first relatively small substantially circular opening and a second relatively small substantially circular opening to facilitate caster and pinion angle adjustment for a motor vehicle axle assembly, said formed adjuster bracket comprising a substantially planar member which includes an elongated opening which corresponds to the elongated opening in the original equipment manufacturer (OEM) axle mounting bracket, a first outwardly extending tab which corresponds to the first relatively small substantially circular opening in the original equipment manufacturer (OEM) axle mounting bracket and a second outwardly extending tab which corresponds to the second relatively small substantially circular opening in the original equipment manufacturer (OEM) axle mounting bracket.

16. The formed adjuster bracket in accordance with claim 15, wherein said formed adjuster bracket includes a first upturned edge portion and a second upturned edge portion to provide reaction points for actuating a cam bolt.

17. The formed adjuster bracket in accordance with claim 16, wherein said formed adjuster bracket has a substantially rectangular configuration.

18. The formed adjuster bracket in accordance with claim 17, wherein said formed adjuster bracket is fabricated from a sheet metal material.

19. The formed adjuster bracket in accordance with claim 15, wherein said formed adjuster bracket has a substantially rectangular configuration.

20. The formed adjuster bracket in accordance with claim 15, wherein said formed adjuster bracket is fabricated from a sheet metal material.

* * * * *